(12) United States Patent
Roman et al.

(10) Patent No.: US 10,359,993 B2
(45) Date of Patent: Jul. 23, 2019

(54) CONTEXTUAL USER INTERFACE BASED ON ENVIRONMENT

(71) Applicant: Essential Products, Inc., Palo Alto, CA (US)

(72) Inventors: Manuel Roman, Sunnyvale, CA (US); Mara Clair Segal, San Francisco, CA (US); Dwipal Desai, Palo Alto, CA (US); Andrew E. Rubin, Los Altos, CA (US)

(73) Assignee: ESSENTIAL PRODUCTS, INC., Palo Alto, CA (US)

( * ) Notice: Subject to any disclaimer, the term of this patent is extended or adjusted under 35 U.S.C. 154(b) by 0 days.

(21) Appl. No.: 15/587,201

(22) Filed: May 4, 2017

(65) Prior Publication Data
US 2018/0210700 A1    Jul. 26, 2018

Related U.S. Application Data

(60) Provisional application No. 62/448,912, filed on Jan. 20, 2017, provisional application No. 62/486,359, filed on Apr. 17, 2017, provisional application No. 62/486,365, filed on Apr. 17, 2017.

(51) Int. Cl.
| | |
|---|---|
| *G06F 3/16* | (2006.01) |
| *G06F 9/451* | (2018.01) |
| *G06F 21/62* | (2013.01) |
| *G10L 15/20* | (2006.01) |
| *G10L 15/22* | (2006.01) |
| *G10L 25/51* | (2013.01) |

(52) U.S. Cl.
CPC .............. *G06F 3/167* (2013.01); *G06F 9/451* (2018.02); *G06F 21/6245* (2013.01); *G10L 15/20* (2013.01); *G10L 15/22* (2013.01); *G10L 25/51* (2013.01); *G06F 2221/2111* (2013.01); *G10L 2015/223* (2013.01)

(58) Field of Classification Search
CPC ........................... G06F 3/04847; G06F 9/4446
See application file for complete search history.

(56) References Cited

U.S. PATENT DOCUMENTS

| | | | |
|---|---|---|---|
| 6,052,556 A | 4/2000 | Sampsell et al. |
| 6,141,003 A | 10/2000 | Chai et al. |
| 6,332,163 B1 | 12/2001 | Bowman-Amuah |
| 6,754,904 B1 | 6/2004 | Kirsh et al. |
| (Continued) | | | |

FOREIGN PATENT DOCUMENTS

| | | |
|---|---|---|
| WO | 2004034210 A2 | 4/2004 |
| WO | 2017053437 A1 | 3/2017 |

OTHER PUBLICATIONS

International Search Report and Written Opinion dated Feb. 13, 2018 for International Application No. PCT/US18/13350, 9 pages.

(Continued)

*Primary Examiner* — Ryan F Pitaro
(74) *Attorney, Agent, or Firm* — Perkins Coie LLP

(57) ABSTRACT

A contextual user interface based on environment is described. An assistant device can determine that speech has been spoken and determine the context of an environment of that speech. A user interface can then be generated based on the context of the environment and the content of the speech. Different context can result in different user interfaces being generated.

23 Claims, 5 Drawing Sheets

(56) References Cited

U.S. PATENT DOCUMENTS

| | | |
|---|---|---|
| 7,340,438 B2 | 3/2008 | Nordman et al. |
| 7,458,093 B2 | 11/2008 | Dukes et al. |
| 7,461,343 B2 | 12/2008 | Kates |
| 7,620,703 B1 | 11/2009 | Shteyn et al. |
| 8,549,578 B2 | 10/2013 | Herigstad et al. |
| 8,745,661 B2 | 6/2014 | Ellis et al. |
| 8,826,322 B2 | 9/2014 | Bliss et al. |
| 8,863,008 B2 | 10/2014 | Chan et al. |
| 9,032,296 B1 | 5/2015 | Lin et al. |
| 9,104,886 B1 * | 8/2015 | Dolbakian ............ G06F 21/62 |
| 9,259,651 B1 | 2/2016 | Yano |
| 9,386,354 B2 | 7/2016 | Archibong et al. |
| 9,424,840 B1 | 8/2016 | Hart et al. |
| 9,460,715 B2 | 10/2016 | Hart et al. |
| 9,480,920 B2 | 11/2016 | Ooya et al. |
| 9,536,106 B2 | 1/2017 | Fram et al. |
| 9,542,060 B1 | 1/2017 | Brenner et al. |
| 9,548,066 B2 | 1/2017 | Jain et al. |
| 9,614,964 B2 | 4/2017 | Stepanian et al. |
| 9,635,410 B2 | 4/2017 | Slothouber et al. |
| 9,646,145 B2 | 5/2017 | Vida et al. |
| 2001/0043232 A1 | 11/2001 | Abbott et al. |
| 2002/0078453 A1 | 6/2002 | Kuo et al. |
| 2002/0089606 A1 | 7/2002 | Forler et al. |
| 2002/0162120 A1 | 10/2002 | Mitchell et al. |
| 2002/0162121 A1 | 10/2002 | Mitchell |
| 2002/0173295 A1 | 11/2002 | Nykanen et al. |
| 2002/0174073 A1 | 11/2002 | Nordman et al. |
| 2002/0184098 A1 | 12/2002 | Giraud et al. |
| 2002/0188589 A1 | 12/2002 | Salmenkaita et al. |
| 2003/0004937 A1 | 1/2003 | Salmenkaita et al. |
| 2003/0229900 A1 | 12/2003 | Reisman |
| 2004/0002932 A1 | 1/2004 | Horvitz et al. |
| 2004/0176958 A1 | 9/2004 | Salmenkaita et al. |
| 2005/0043095 A1 | 2/2005 | Larson et al. |
| 2005/0137747 A1 | 6/2005 | Miro et al. |
| 2005/0227762 A1 | 10/2005 | Tahara et al. |
| 2005/0283532 A1 | 12/2005 | Kim et al. |
| 2006/0048189 A1 | 3/2006 | Park et al. |
| 2006/0123053 A1 | 6/2006 | Scannell |
| 2006/0184800 A1 * | 8/2006 | Rosenberg ............ G06F 21/32 713/186 |
| 2006/0223637 A1 | 10/2006 | Rosenberg et al. |
| 2007/0015580 A1 | 1/2007 | Hunter et al. |
| 2007/0157320 A1 | 7/2007 | Collins et al. |
| 2008/0062318 A1 | 3/2008 | Ellis et al. |
| 2008/0088421 A1 | 4/2008 | McMillan et al. |
| 2008/0214210 A1 | 9/2008 | Rasanen et al. |
| 2008/0297589 A1 | 12/2008 | Kurtz et al. |
| 2008/0298571 A1 | 12/2008 | Kurtz et al. |
| 2009/0064221 A1 | 3/2009 | Stevens et al. |
| 2009/0138903 A1 | 5/2009 | Blanchard et al. |
| 2009/0150340 A1 | 6/2009 | Lhuillier et al. |
| 2009/0288013 A1 * | 11/2009 | Zhang ................ G06F 9/4443 715/744 |
| 2009/0327894 A1 | 12/2009 | Rakib et al. |
| 2010/0006684 A1 | 1/2010 | Burton |
| 2010/0106782 A1 | 4/2010 | Huang et al. |
| 2010/0257565 A1 | 10/2010 | Lucas et al. |
| 2010/0311503 A1 | 12/2010 | McMain et al. |
| 2010/0313239 A1 | 12/2010 | Chakra et al. |
| 2011/0077078 A1 | 3/2011 | Taoka et al. |
| 2011/0134322 A1 | 6/2011 | Wills et al. |
| 2011/0137727 A1 | 6/2011 | Chung et al. |
| 2011/0169928 A1 | 7/2011 | Gassel et al. |
| 2011/0211584 A1 | 9/2011 | Mahmoud et al. |
| 2011/0285704 A1 | 11/2011 | Takeda et al. |
| 2012/0034904 A1 | 2/2012 | LeBeau et al. |
| 2012/0086630 A1 | 4/2012 | Zhu et al. |
| 2012/0110621 A1 | 5/2012 | Gossweiler et al. |
| 2012/0117593 A1 | 5/2012 | Pan et al. |
| 2012/0142414 A1 | 6/2012 | Murakami et al. |
| 2012/0166668 A1 | 6/2012 | Mathews et al. |
| 2012/0233564 A1 | 9/2012 | Tsuchiya et al. |
| 2012/0242490 A1 | 9/2012 | Baccichet et al. |
| 2012/0242590 A1 | 9/2012 | Baccichet et al. |
| 2012/0276997 A1 | 11/2012 | Chowdhary et al. |
| 2012/0284618 A1 | 11/2012 | Bailor et al. |
| 2012/0296909 A1 | 11/2012 | Cao et al. |
| 2012/0302352 A1 | 11/2012 | Ajami et al. |
| 2012/0309537 A1 | 12/2012 | Nogami et al. |
| 2012/0309542 A1 | 12/2012 | Nogami et al. |
| 2013/0151728 A1 | 6/2013 | Currier et al. |
| 2013/0212615 A1 | 8/2013 | Schultz et al. |
| 2013/0288789 A1 | 10/2013 | Shikata et al. |
| 2013/0312039 A1 | 11/2013 | Kuo et al. |
| 2013/0326578 A1 | 12/2013 | Blom et al. |
| 2014/0007245 A1 | 1/2014 | Bank et al. |
| 2014/0038708 A1 | 2/2014 | Davison et al. |
| 2014/0049487 A1 | 2/2014 | Konertz et al. |
| 2014/0120961 A1 | 5/2014 | Buck et al. |
| 2014/0123190 A1 | 5/2014 | Song et al. |
| 2014/0157422 A1 | 6/2014 | Livshits et al. |
| 2014/0168277 A1 | 6/2014 | Ashley et al. |
| 2014/0170979 A1 * | 6/2014 | Samanta Singhar ... G10L 25/60 455/41.2 |
| 2014/0181715 A1 | 6/2014 | Axelrod et al. |
| 2014/0201345 A1 * | 7/2014 | Abuelsaad .......... H04L 41/5067 709/223 |
| 2014/0207452 A1 | 7/2014 | Klein et al. |
| 2014/0223464 A1 | 8/2014 | Moran et al. |
| 2014/0229887 A1 | 8/2014 | Ellis et al. |
| 2014/0267911 A1 | 9/2014 | Grant et al. |
| 2014/0281012 A1 | 9/2014 | Troxler et al. |
| 2014/0282746 A1 | 9/2014 | Lin et al. |
| 2014/0354531 A1 | 12/2014 | Foreman |
| 2014/0365885 A1 * | 12/2014 | Carson .................... G06F 3/167 715/708 |
| 2015/0020191 A1 | 1/2015 | Vida et al. |
| 2015/0033305 A1 | 1/2015 | Shear et al. |
| 2015/0046425 A1 * | 2/2015 | Lin ...................... G06F 9/4843 707/708 |
| 2015/0058758 A1 | 2/2015 | Tseng |
| 2015/0089668 A1 | 3/2015 | Baldwin et al. |
| 2015/0127628 A1 | 5/2015 | Rathod |
| 2015/0150140 A1 | 5/2015 | Biswas et al. |
| 2015/0156171 A1 | 6/2015 | Biswas et al. |
| 2015/0160788 A1 | 6/2015 | Sun et al. |
| 2015/0169336 A1 * | 6/2015 | Harper .................... G10L 15/22 715/706 |
| 2015/0186156 A1 * | 7/2015 | Brown ................ G06F 3/04817 715/706 |
| 2015/0195620 A1 | 7/2015 | Holmquist et al. |
| 2015/0213800 A1 * | 7/2015 | Krishnan ............ H04M 3/4936 704/246 |
| 2015/0264444 A1 | 9/2015 | Wen et al. |
| 2015/0304605 A1 | 10/2015 | Shaw et al. |
| 2015/0339046 A1 * | 11/2015 | Hegde .................... G09G 5/377 715/798 |
| 2015/0348548 A1 * | 12/2015 | Piernot .................... G10L 15/22 704/235 |
| 2015/0373065 A1 | 12/2015 | Holmquist et al. |
| 2016/0026812 A1 | 1/2016 | Kim et al. |
| 2016/0034148 A1 * | 2/2016 | Wilson ................ G06F 3/04842 715/835 |
| 2016/0044357 A1 | 2/2016 | Wang |
| 2016/0085430 A1 | 3/2016 | Moran et al. |
| 2016/0109941 A1 | 4/2016 | Govindarajeswaran et al. |
| 2016/0154460 A1 | 6/2016 | Von Liechtenstein |
| 2016/0162172 A1 | 6/2016 | Rathod |
| 2016/0170730 A1 | 6/2016 | Ollikainen et al. |
| 2016/0219338 A1 | 7/2016 | Wang et al. |
| 2016/0232784 A1 | 8/2016 | Bineau et al. |
| 2016/0263477 A1 | 9/2016 | Ladd et al. |
| 2016/0277052 A1 | 9/2016 | Sadek et al. |
| 2016/0283698 A1 | 9/2016 | Huang et al. |
| 2016/0328667 A1 * | 11/2016 | Macciola ............ G06Q 10/0633 |
| 2016/0358454 A1 | 12/2016 | Grove et al. |
| 2017/0011602 A1 | 1/2017 | Bray et al. |
| 2017/0031575 A1 * | 2/2017 | Dotan-Cohen .......... G06F 3/038 |
| 2017/0050112 A1 | 2/2017 | Fukuda et al. |
| 2017/0063750 A1 | 3/2017 | Vardhan et al. |
| 2017/0064390 A1 | 3/2017 | Kannan et al. |

(56) References Cited

U.S. PATENT DOCUMENTS

| | | | |
|---|---|---|---|
| 2017/0134822 A1 | 5/2017 | Nguyen et al. | |
| 2017/0155964 A1 | 6/2017 | Oztaskent et al. | |
| 2017/0185920 A1* | 6/2017 | Chawla | G06N 5/04 |
| 2017/0187711 A1* | 6/2017 | Joo | H04L 63/0861 |
| 2017/0249009 A1 | 8/2017 | Parshionikar et al. | |
| 2017/0289766 A1* | 10/2017 | Scott | H04W 4/023 |
| 2018/0054688 A1* | 2/2018 | Cartwright | H04S 3/002 |
| 2019/0130621 A1* | 5/2019 | Johnson | G06T 11/60 |

OTHER PUBLICATIONS

Non-Final Office Action dated Feb. 16, 2018 for U.S. Appl. No. 15/673,911 of Roman, M. et al. filed Aug. 10, 2017.
International Search Report and Written Opinion dated Aug. 25, 2017, for International Application No. PCT/US2017/35545, 7 pages.
U.S. Appl. No. 15/599,398 of Roman, M. et al. filed May 18, 2017.
U.S. Appl. No. 15/600,563 of Roman, M. et al. filed May 19, 2017.
U.S. Appl. No. 15/604,402 of Roman, M. et al. filed May 24, 2017.
U.S. Appl. No. 15/629,459 of Roman, M. et al. filed Jun. 21, 2017.
U.S. Appl. No. 15/673,911 of Roman, M. et al. filed Aug. 10, 2017.
Non-Final Office Action dated Nov. 2, 2017 for U.S. Appl. No. 15/629,459 of Roman, M. et al., filed Jun. 21, 2017.
Non-Final Office Action dated Oct. 20, 2017 for U.S. Appl. No. 15/599,398 of Roman, M., et al., filed May 18, 2017.
Vlasic, Dan , "Review Unkilled—Zombies in New York and North Korean Invasion", www.pocketmeta.com, Sep. 26, 2015, pp. 1-14.
Non-Final Office Action dated Sep. 5, 2017 in U.S. Appl. No. 15/600,563 of Roman, M. et al., filed May 19, 2017.
Non-Final Office Action dated Sep. 21, 2017 for U.S. Appl. No. 15/604,402 of Roman, M., et al. filed May 24, 2017.
Coppens, Toon et al., "AmigoTV: A Social TV Experience Through Triple-Play Convergence", Alcatel, 2005, pp. 1-10.
Final Office Action dated Jul. 5, 2018 for U.S. Appl. No. 15/604,402 of Roman, M., et al. filed May 24, 2017.
"Microsoft Computer Dictionary", Fifth edition, Microsoft Press, Microsoft Corporation, 2002, 5 pages.
Final Office Action dated Jun. 20, 2018 for U.S. Appl. No. 15/600,563 of Roman, M., et al. filed May 19, 2017.
Final Office Action dated May 11, 2018 for U.S. Appl. No. 15/599,398 of Roman, M. et al. filed May 18, 2017.
Galitz, Wilbert O., "The Essential Guide to User Interface Design", Second Edition, John Wiley & Sons, Inc., New York, 2002, 38 pages.
First Office Action dated Feb. 19, 2018 for Austrian Patent Application No. A9001/2017, 7 pages.
First Office Action dated Feb. 8, 2018 for Austrian Patent Application No. GM9001/2017, 9 pages.
Mills, Adam, "Translating Home Assistant", [Internet] Accessed on Jan. 16, 2018: <<https://home-assistant.io/blog/2017/11/05/frontend-translations/>>, May 11, 2017, 4 pages.
Schiller, Kai, "L.U.C.Y.—Home Assistant with touch screen and facial recognition", [Internet] Accessed on Jan. 16, 2018: <<https://www.homeandsmart.de/lucy-home-assistant-with-touchscreen-and-face-recognition>>, Aug. 22, 2016, 6 pages.

* cited by examiner

CONTEXTUAL USER INTERFACE BASED ON ENVIRONMENT

CLAIM FOR PRIORITY

This application claims priority to U.S. Provisional Patent Application No. 62/448,912, entitled "Contextual User Interface Based on Environment," by Roman et al., and filed on Jan. 20, 2017. This application also claims priority to U.S. Provisional Patent Application No. 62/486,359, entitled "Contextual User Interface Based on Environment," by Roman et al., and filed on Apr. 17, 2017. This application also claims priority to U.S. Provisional Patent Application No. 62/486,365, entitled "Contextual User Interface Based on Changes in Environment," by Roman et al., and filed on Apr. 17, 2017. The content of the above-identified applications are incorporated herein by reference in their entirety.

TECHNICAL FIELD

This disclosure relates to user interfaces, and in particular a user interface that is adaptive based on the context of the environment.

BACKGROUND

The Internet of Things (IoT) allows for the internetworking of devices to exchange data among themselves to enable sophisticated functionality. For example, devices configured for home automation can exchange data to allow for the control and automation of lighting, air conditioning systems, security, etc. In the smart home environment, this can also include home assistant devices providing an intelligent personal assistant to respond to speech. For example, a home assistant device can include a microphone array to receive voice input and provide the corresponding voice data to a server for analysis to provide an answer to a question asked by a user. The server can provide that answer to the home assistant device, which can provide the answer as voice output using a speaker. As another example, the user can provide a voice command to the home assistant device to control another device in the home, for example, a command to turn a light bulb on or off. As such, the user and the home assistant device can interact with each other using voice, and the interaction can be supplemented by a server outside of the home providing the answers. However, homes can have different users interacting with the home assistant device within different contextual environments (e.g., from different locations and at different times) within the home.

SUMMARY

Some of the subject matter described herein includes a home assistant device, including: a display screen; a microphone; one or more processors; and memory storing instructions, wherein the one or more processors are configured to execute the instructions such that the one or more processors and memory are configured to: determine that first speech has been spoken in a vicinity of the home assistant device using the microphone; determine a first context of an environment of the home assistant device, the first context of the environment including one or more of a location of a user providing the first speech, a time of the first speech, a user identity corresponding to the user providing the first speech, a skill level with interacting with the home assistant device of the user providing the first speech, a schedule of the user providing the first speech, or characteristics of the first speech; display a first graphical user interface (GUI) for the assistant device on the display screen to provide a response regarding the first speech, the first GUI based on the first context of the environment and content of the first speech; determine that second speech has been spoken in the vicinity of the home assistant device using the microphone, the first speech and the second speech including the same content; determine a second context of an environment of the home assistant device, the second context of the environment including one or more of a location of a user providing the second speech, a time of the second speech, a user identity corresponding to the user providing the second speech, a skill level with interacting with the home assistant device of the user providing the second speech, a schedule of the user providing the second speech, or characteristics of the second speech, the first context and the second context being different; and display a second GUI for the assistant device on the display screen to provide a response regarding the second speech, the second GUI based on the second context of the environment and content of the second speech, the first GUI and the second GUI providing different content.

Some of the subject matter described herein also includes a method for providing a contextual user interface, including: determining, by a processor, that a first speech has been spoken; determining, by the processor, a first context of an environment corresponding to the first speech; providing, by the processor, a first user interface based on the first context of the environment and content of the first speech; determining, by the processor, that a second speech has been spoken, the second speech spoken at a different time than the first speech; determining, by the processor, a second context of the environment corresponding to the second speech, the first context and the second context being different; and providing, by the processor, a second user interface based on the second context of the environment and content of the second speech, the content of the first speech and the second speech being similar, the first user interface and the second user interface being different.

In some implementations, the first context is based on one or both of audio or visual determinations of a surrounding environment of an assistant device that the first speech and the second speech is directed.

In some implementations, the first context includes a first interaction corresponding to the first speech at a first distance, wherein the second context includes a second interaction corresponding to the second speech at a second distance, the first distance and the second distance being different.

In some implementations, the first context includes a first user providing the first speech, the second context includes a second user providing the second speech, the first user and the second user being different.

In some implementations, the first user is associated with a first skill level with interacting with an assistant device, the second user is associated with a second skill level with interacting with the assistant device, the first skill level and the second skill level being different, the first context based on the first skill level, and the second context based on the second skill level.

In some implementations, the first context and the second context include one or more of a user interacting with an assistant device, people in the environment around the assistant device, a time of an interaction with the assistant device, a location of a user interacting with the assistant device, or a skill level of a user interacting with the assistant device.

In some implementations, the method includes: determining, by the processor, a change in the environment; and generating, by the processor, a third user interface based on one or more of the first context or the second context in response to the change in the environment to maintain privacy expectations of one or more users present in the environment.

Some of the subject matter described herein also includes an electronic device, including: one or more processors; and memory storing instructions, wherein the processor is configured to execute the instructions such that the processor and memory are configured to: determine that a first speech has been spoken; determine a first context of an environment corresponding to the first speech; generate a first user interface based on the first context of the environment and content of the first speech; determine that a second speech has been spoken, the second speech spoken at a different time than the first speech; determine a second context of the environment corresponding to the second speech, the first context and the second context being different; and generate a second user interface based on the second context of the environment and content of the second speech, the content of the first speech and the second speech being similar, the first user interface and the second user interface being different.

In some implementations, the first context is based on one or both of audio or visual determinations of a surrounding environment of an assistant device that the first speech and the second speech is directed.

In some implementations, the first context includes a first interaction corresponding to the first speech at a first distance, wherein the second context includes a second interaction corresponding to the second speech at a second distance, the first distance and the second distance being different.

In some implementations, the first context includes a first user providing the first speech, the second context includes a second user providing the second speech, the first user and the second user being different.

In some implementations, the first user is associated with a first skill level with interacting with an assistant device, the second user is associated with a second skill level with interacting with the assistant device, the first skill level and the second skill level being different, the first context based on the first skill level, and the second context based on the second skill level.

In some implementations, the first context and the second context include one or more of a user interacting with an assistant device, people in the environment around the assistant device, a time of an interaction with the assistant device, a location of a user interacting with the assistant device, or a skill level of a user interacting with the assistant device.

In some implementations, the processor is configured to execute the instructions such that the processor and memory are configured to: determine a change in the environment; and generate a third user interface based on one or more of the first context or the second context in response to the change in the environment to maintain privacy expectations of one or more users present in the environment.

Some of the subject matter described herein also includes a computer program product, comprising one or more non-transitory computer-readable media having computer program instructions stored therein, the computer program instructions being configured such that, when executed by one or more computing devices, the computer program instructions cause the one or more computing devices to: determine that a first speech has been spoken; determine a first context of an environment corresponding to the first speech; generate a first user interface based on the first context of the environment and content of the first speech; determine that a second speech has been spoken, the second speech spoken at a different time than the first speech; determine a second context of the environment corresponding to the second speech, the first context and the second context being different; and generate a second user interface based on the second context of the environment and content of the second speech, the content of the first speech and the second speech being similar, the first user interface and the second user interface being different.

In some implementations, the first context is based on one or both of audio or visual determinations of a surrounding environment of an assistant device that the first speech and the second speech is directed.

In some implementations, the first context includes a first interaction corresponding to the first speech at a first distance, wherein the second context includes a second interaction corresponding to the second speech at a second distance, the first distance and the second distance being different.

In some implementations, the first context includes a first user providing the first speech, the second context includes a second user providing the second speech, the first user and the second user being different.

In some implementations, the first user is associated with a first skill level with interacting with an assistant device, the second user is associated with a second skill level with interacting with the assistant device, the first skill level and the second skill level being different, the first context based on the first skill level, and the second context based on the second skill level.

In some implementations, the first context and the second context include one or more of a user interacting with an assistant device, people in the environment around the assistant device, a time of an interaction with the assistant device, a location of a user interacting with the assistant device, or a skill level of a user interacting with the assistant device.

In some implementations, the computer program instructions cause the one or more computing devices to: determine a change in the environment; and generate a third user interface based on one or more of the first context or the second context in response to the change in the environment to maintain privacy expectations of one or more users present in the environment.

Some of the subject matter described herein also includes an electronic device including: a display screen; one or more processors; and memory storing instructions, wherein the processor is configured to execute the instructions such that the processor and memory are configured to: determine a first occurrence of a first activity within an environment of the electronic device; determine a first context of the environment of the electronic device; and display a first graphical user interface (GUI) on the display screen based on the first context of the environment and the first activity.

In some implementations, the first activity is one or more of speech spoken within the environment, or noise generated by an object within the environment.

In some implementations, the processor is configured to execute the instructions such that the processor and memory are configured to: determine a second occurrence of a second activity within the environment of the electronic device; determine a second context of the environment of the electronic device, the first context and the second context being different; and display a second graphical user interface (GUI) on the display screen based on the second context of the environment and the second activity, first content of the first GUI being different than second content of the second GUI.

In some implementations, the first activity and the second activity are similar, and the first content of the first GUI is different than the second content of the second GUI based on differences between the first context of the environment and the second context of the environment.

In some implementations, the first content includes a first number of graphical representations of information or access to functionality provided by the electronic device, the second content includes a second number of graphical representation of information or access to functionality provided by the electronic device, the first number and the second number being different.

In some implementations, the first content includes a first graphical representation of an item providing information or access to functionality provided by the electronic device at a first size, the second content includes a second graphical representation of the item at a second size, the first size and the second size being different.

In some implementations, the first activity is speech spoken within the environment of the electronic device, the first context of the environment including one or more of a location of a user providing the speech, a time of the speech, a user identity corresponding to the user providing the speech, a skill level with interacting with the home assistant device of the user providing the speech, a schedule of the user providing the speech, or characteristics of the speech.

In some implementations, the first GUI includes content responding to the first activity based on the first context.

DETAILED DESCRIPTION

This disclosure describes devices and techniques for providing a user interface for a home assistant device based on the context, or characteristics, of its surrounding environment. In one example, the user interface of the home assistant device (e.g., a graphical user interface (GUI) generated for display on a display screen of the home assistant device) can be different based on a combination of contextual factors of the surrounding environment including the person interacting with the home assistant device, the people in the surrounding environment, the time, the location of the home assistant device within the home, the location of the person interacting with the home assistant device, the presence of strangers, interests of the users, etc. As a result, based on the contextual factors, different content (e.g., information, graphical icons providing access to functionality of the home assistant device, etc.) can be displayed by the home assistant device.

Additionally, the same content can be displayed differently. For example, different languages, visual effects, etc. can be provided based on the context of the environment. In another example, two different users (or even the same user at different times) might ask the same question to the home assistant device. Based on differences within the context of the environment when the question is asked, the user interface can provide the same answers to the question differently.

Figure 1:
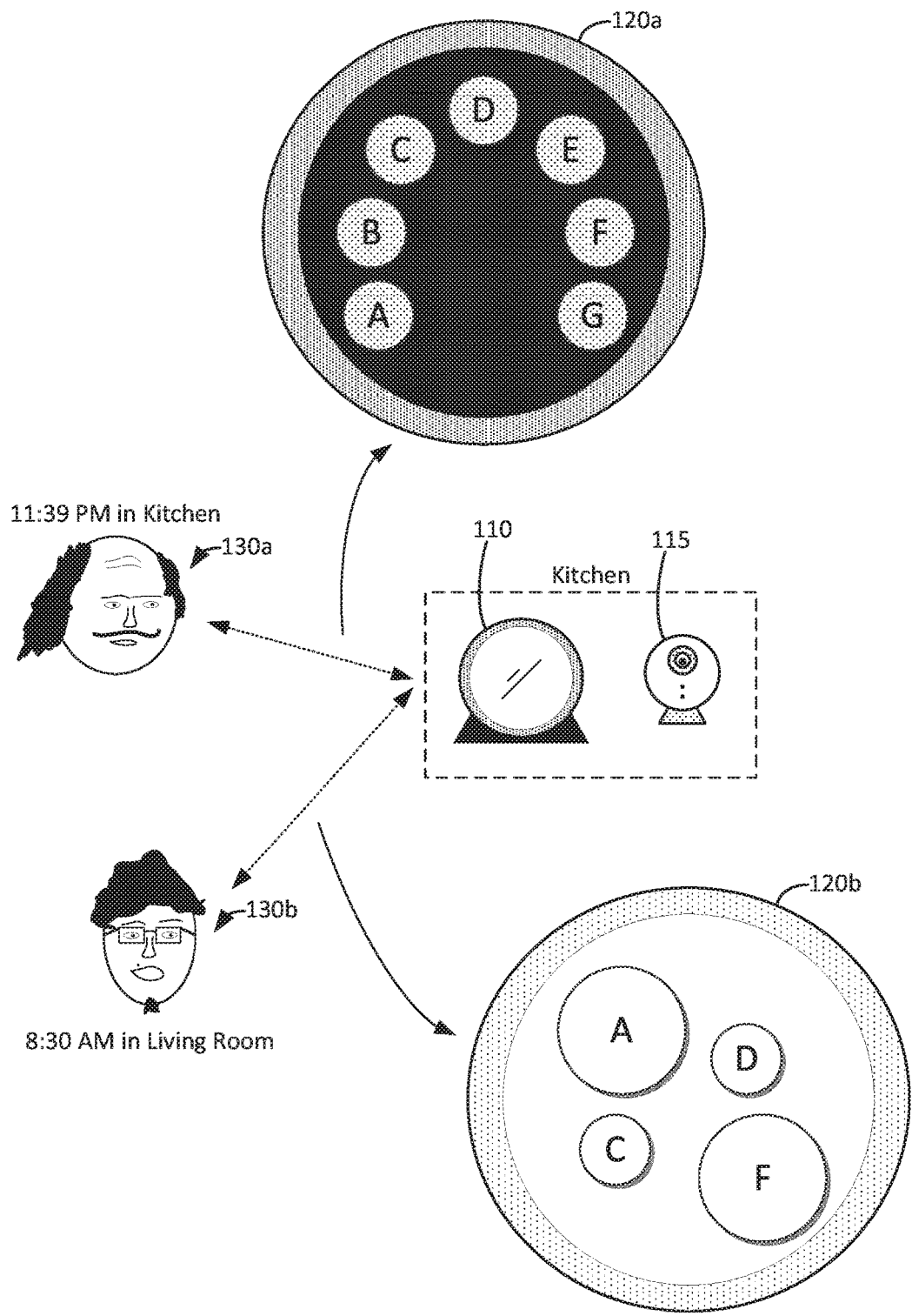
FIG. 1 illustrates an example of an assistant device providing a user interface based on the context of the environment.

In more detail, FIG. 1 illustrates an example of an assistant device providing a user interface based on the context of the environment. In FIG. 1, home assistant device 110 can include a microphone (e.g., a microphone array) to receive voice input from users and a speaker to provide audio output in the form of a voice (or other types of audio) to respond to the user. Additionally, home assistant device 110 can include a display screen to provide visual feedback to users by generating a graphical user interface (GUI) providing content for display. For example, a user can ask home assistant device 110 a question and a response to that question can be provided on the display screen. Additional visual components, such as light emitting diodes (LEDs), can also be included. As a result, the user interface can include audio, voice, display screens, lighting, and other audio or visual components. In some implementations, camera 115 can also be included for home assistant device 110 to receive visual input of its surrounding environment. Camera 115 can be physically integrated (e.g., physically coupled with) with home assistant device 110 or camera 115 can be a separate component of a home's wireless network that can provide video data to home assistant device 110.

In FIG. 1, home assistant device 110 can be in a particular location of the home, for example, the kitchen. Different users might interact with home assistant device from different locations within the home (e.g., the kitchen or the living room) and at different times. Additionally, the different users might be interested in different features, functionalities, or information provided by home assistant device 110. These different contextual factors of the environment of home assistant device 110 can result in the user interface of home assistant device 110 to be changed. Because the user interface can provide content such as features, functionalities, information, etc., this can result in different content being displayed on the display screen. That is, different combinations of contextual factors of the environment can result in a different user interface of home assistant device 110, resulting in an adaptive user interface based on context of the environment. The contextual factors can also include demographics of the users. For example, if a child is using home assistant device 110 then the content provided can be different than if an adult is using home assistant device 110 (e.g., provide kid-friendly content).

For example, in FIG. 1, user 130a can be in the kitchen (i.e., in the same room or within close proximity with home assistant device 110) at 11:39 PM in the evening. Home assistant device 110 can recognize user 130a, for example, using video input from camera 115 to visually verify user 130a. In another example, home assistant device 110 can recognize user 130a through speech recognition as user 130a speaks either to home assistant device 110, to other people, or even himself. User 130a can also have had previous interactions with home assistant device 110, and therefore, home assistant device 110 can remember the likes or preferences, expectations, schedule, etc. of user 130a. As a result, user interface 120a can be generated for user 130a to interact with home assistant device 110 based on the current context of the environment indicating the user, time, and location that the user is speaking from.

By contrast, user 130b can be in the living room at 8:30 AM of the same home as home assistant device 110. Because the user, time, and location of the user are different, home assistant device 110 can generate a different user interface 120b providing a different GUI having different content as depicted in FIG. 1. As a result, user interface 120b can be different from user interface 120a because they are provided, or generated, in response to different contextual environments when users 130a and 130b speak. This can occur even if the content of the speech provided by users 130a and 130b is similar, or even the same. For example, if both users 130a and 130b ask the same or similar question (e.g., their speech includes similar or same content such as asking for a list of new restaurants that have opened nearby), the user interface (to respond to the question) that is provided by home assistant device 110 can be different because of the different context of the environments when the speech was spoken. Additionally, the users might have different interests (e.g., as indicated by a profile) which can also result in different content providing different services, functionalities, etc.

In another example, because user interface 120a was generated in the evening, it can have different colors, brightness, or other visual characteristics than display 120b. This might be done because the user interface should not be too disruptive in different lighting situations. For example, a light sensor (e.g., a photodiode) can be used to determine that a room is dark. Home assistant device 110 can then adjust the brightness of the display screen based on the determined lighting situation in the environment.

Additionally, because users 130a and 130b are in different rooms and, therefore, at different distances from home assistant device 110, the user interfaces 120a and 120b can be different to take that into account. For example, because user 130a in FIG. 1 is in the kitchen, he may be relatively close to home assistant device 110 and, therefore, the size of some of the content (e.g., items A-G which can be buttons, icons, text, etc.) of a GUI provided as user interface 120a can be relatively small. By contrast, because user 130b is in the living room (i.e., farther away from home assistant device 110 than user 130a), some of the content of user interface 120b can be larger so that they can be more easily seen from a distance. For example, in FIG. 1, icons A and F have different sizes among the different user interfaces 120a and 120b. That is, content such as the items of the user interfaces that provide access to the same functionality or provide an indication to the same type of information can be be different sizes because the contextual environments are different. For example, if users 130a and 130b request a listing of new, nearby restaurants, icons A-G might represent a list of some of the identified restaurants. Additionally, the playback of audio can be at a volume based on the distance that a user is from home assistant device 110. For example, a user that is farther away can result in the playback of audio that is at a higher volume than if a user is closer to home assistant device 110.

User interfaces 120a and 120b can also be different in other ways. For example, the location of content, the number of content, etc. as depicted in FIG. 1 can also be different due to the different contextual environments.

Figure 2:
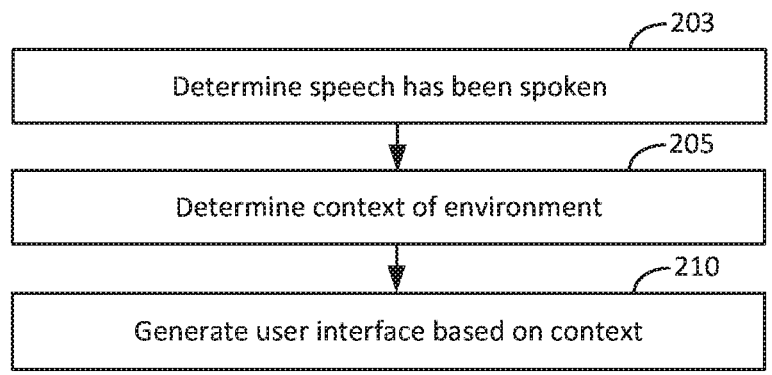
FIG. 2 illustrates an example of a block diagram providing a user interface based on the context of the environment.

FIG. 2 illustrates an example of a block diagram providing a user interface based on the context of the environment. In FIG. 2, at block 203, speech can be determined to have been spoken. For example, a microphone of home assistant device 110 can pick up speech spoken within the environment. That speech can be converted into voice data and analyzed by a processor of home assistant device 110 to determine that speech has been received. At block 205, the context of the surrounding environment or vicinity around home assistant device 110 can be determined. For example, home assistant device 110 can determine any of the aforementioned details regarding the environment in the physical space around home assistant device 110 including time, user, prior interactions with the user, locations of the user and home assistant device 110, etc. Any of the details discussed below can also be determined. At block 210, the user interface can be provided or generated based on the determined context and content of the speech. For example, this can include generating a GUI with content related to the content of the speech and provided at various sizes, colors, etc. on a display screen of home assistant device 110 based on the context. In some implementations, the user interface can also include playback of audio (e.g., sounds), turning on various lighting effects (e.g., LEDs), etc. For example, different GUIs with different audio effects can be provided.

Next, home assistant device 110 can pick up more speech at a different time. However, if the context of the environment is different, then a different user interface than that generated at block 210 can be generated. Thus, even if the content of the speech at the two different times was the same, the user interfaces generated can be different if the context of the environment was different.

Figure 3:
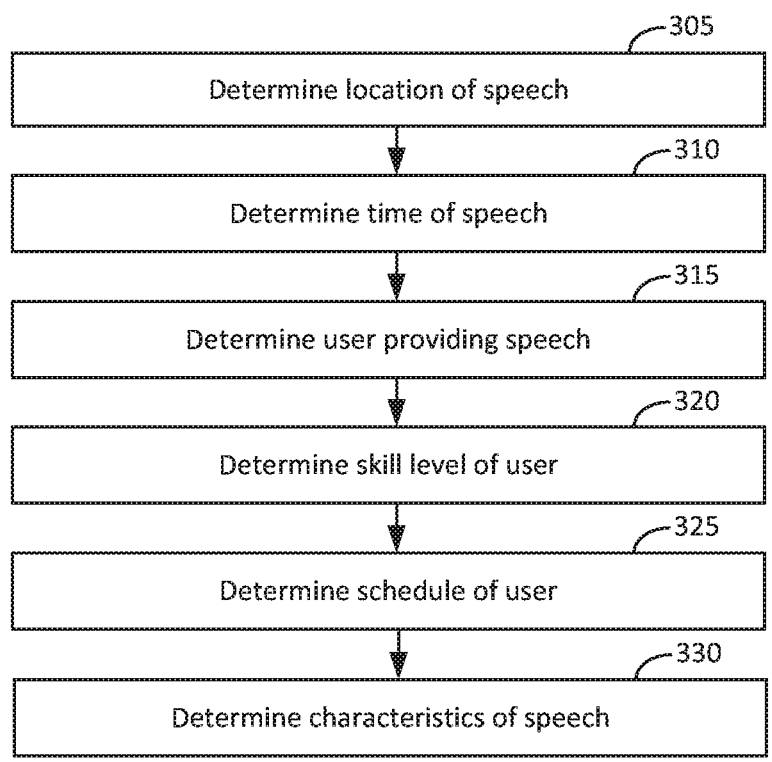
FIG. 3 illustrates an example of a block diagram determining the context of the environment of an assistant device.

FIG. 3 illustrates an example of a block diagram determining the context of the environment of an assistant device. In FIG. 3, as previously discussed, the location of the speech can be determined at block 305, the time of the speech can be determined at block 310, and the user providing speech can be determined at block 315 to determine the context of the environment.

Other details can include the skill level of the user at block 320. For example, home assistant device 110 can determine the skill level of a user as they interact more with the user interface. If the user uses more functionality, more complicated functionality, requests significant amount of detail regarding functionality, etc. then the user can be identified by home assistant device 110 as a more sophisticated user. By contrast, if another user tends to ask the same repetitive tasks or questions of home assistant device 110 then the user can be identified as a less sophisticated user. If the user tends to use less complicated functionality, less functionality, or does not request significant detail, then the user can also be identified as a less sophisticated user. In FIG. 1, user 130a can be a more sophisticated user indicating that the user has a relatively high skill level in using home assistant device 110, and therefore, more functionality (or content) can be provided on user interface 120a (i.e., items A-G are provided). By contrast, user 130b can be a less sophisticated user indicating that the user has a relatively lower skill level (than user 130a), and therefore, less content can be provided on user interface 120b (i.e., fewer items A, C, D, and F are provided). In some implementations, the same number of content of user interfaces might be provided, but different content corresponding to different functionalities or features might be displayed based on the skill level of the user. Thus, different content can be provided in a user interface of home assistant device 110.

As previously discussed, the user interface can include other visual components other than displaying content as part of a GUI on a display screen. In FIG. 1, this can include lighting, for example, LEDs or other types of lights which can be activated by being turned on, glow, flicker, display a particular color, etc. to provide an indication to a user of a situation. For example, home assistant device 110 can determine a user's schedule at block 325 and provide an indication as to when the user should be leaving the home so that they can maintain that schedule without any tardiness. In FIG. 1, this can result in a ring around the display screen that can be different colors (e.g., implemented with LEDs or other types of lighting), however in other implementations the ring can be part of the display screen itself.

In one example, the ring can be a color corresponding to the traffic or commute status for the user to go to their next expected location, such as the workplace in the morning or a coffee meeting scheduled on their calendar. If the ring is set to a green color, then this can indicate to the user that the traffic is relatively light. By contrast, a red color can indicate that the traffic is relatively heavy. This type of user interface can provide a user with information while they are far away from home assistant device 110 because the colors can be easily seen from a distance. In some implementations, the ring can also indicate whether the user needs to leave soon or immediately if they want to make the next appointment on their schedule. For example, the intensity or brightness of the color can be increased, the ring can be blinking, etc. This can provide further detail from a distance for a user. In some implementations, the user interface can also display on the display screen a route to the location of the next event on their schedule, provide a time estimate, etc. As a result, if the user decides that they want more detail and walks closer to home assistant device 110, information can be readily displayed and available. In some implementations, home assistant device 105 can determine that the user is walking closer after the ring has been activated and then process information and display the additional information on the display screen so that information is available when they are closer. In some implementations, the color of the ring can indicate other determinations, for example, an unexpected situation such as a window or door being open, water flooding detected, or the temperature is within a temperature range corresponding to an anomaly.

The user interface can also include audio sounds for playback. For example, user interface 120a in FIG. 1 might play back one type of audio sound when user 130a interacts with it, for example, selecting one of the items A-G, requesting user interface 120a to change (e.g., provide new content), etc. By contrast, user interface 120b might play back different sounds for the same interactions by user 130b because of the different context of the environment.

Characteristics regarding the speech received by home assistant device 110 can also be determined at block 330. For example, home assistant device 110 can determine the volume, speed, accent, language, tone, etc. of speech and use that as a contextual factor in providing a user interface. In one example, if a user is speaking quickly (e.g., at a speed or rate determined to be within a words per minute range corresponding to speaking quickly), then content of the user interface may be updated faster than if the user was speaking slowly, for example, by updating the GUI of the user interface sooner. In another example, if the user's speech is determined to be indicative of stress or frustration, then the user interface might provide content differently than if the user's speech is determined to be relatively free of stress or frustration. As an example, if the user is stressed or frustrated, then the amount of content provided on the user interface can be reduced in comparison with the user not being stressed or frustrated.

In some implementations, if the user is determined to be stressed or frustrated, then the user interface can include the playback of music. For example, calming music can be played back using the speaker of home assistant device 110.

In some implementations, the lighting of home assistant device 110 can be different based on what is provided on the user interface. For example, different types of content can result in different brightness, colors, etc.

Figure 4:
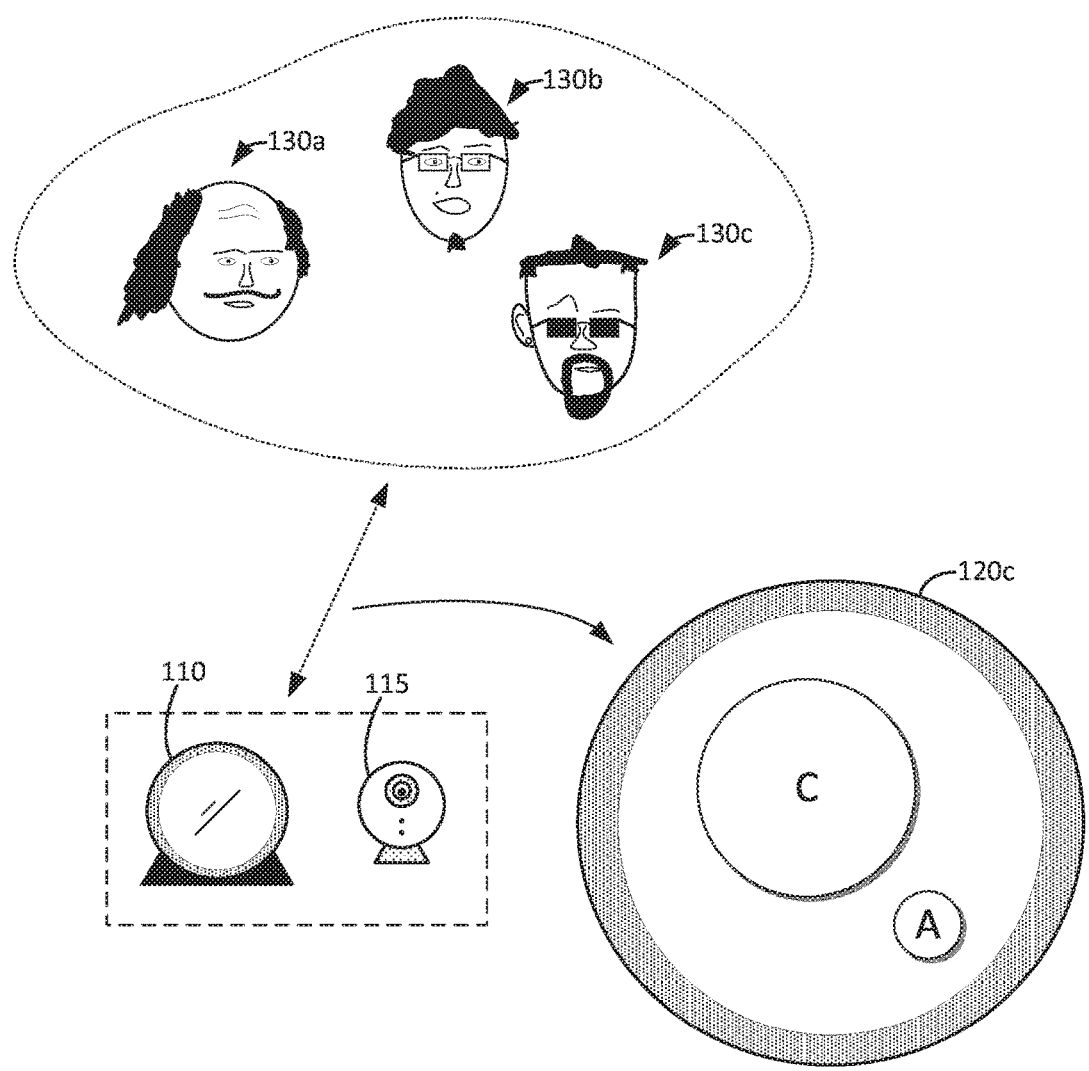
FIG. 4 illustrates another example of an assistant device providing a user interface based on the context of the environment.

The user interface can also be changed to account for privacy expectations of a user when the context of the environment changes (i.e., the conditions or characteristics of the environment change). FIG. 4 illustrates another example of an assistant device providing a user interface based on the context of the environment. In FIG. 4, users 130a, 130b, and 130c are within the home environment of home assistant device 110. These different users can be identified and the user interface 120c in FIG. 4 can be generated to take into account privacy concerns of the various users.

For example, user 130a might want some content to be provided on a user interface if he is alone, but might not want that content to be displayed if others are within the home. Likewise, user 130b also might not want some content to be provided. In some implementations, user 130a might find it acceptable to have the content provided on the user interface even if the presence of user 130b is detected because user 130b is a member of the same household. However, user 130a might want that content to not be displayed if strangers or guests are in the home. User 130c can be a stranger or newcomer into the home environment and has never interacted with home assistant device 110 and therefore, is unrecognized by home assistant device 110.

Home assistant device 110 can recognize the different users or persons within the home and generate user interface 120c based on the users 130a-c. For example, home assistant device 110 can take some details of user interfaces 120a and 120b (e.g., user interfaces normally for users 130a and 130b, respectively) and generate user interface 120c in FIG. 4 based on those other user interfaces. That is, user interface 120c can be generated based on how user interfaces would be generated for users 130a and 130b. In FIG. 4, this results in some content of user interface 120b having a relatively large size (e.g., as in user interface 120b), but less content than either user interfaces 120a or 120b. In some implementations, content that would mutually exist in user interfaces 120a and 120b can be provided within user interface 120c, but content that is only on one of user interfaces 120a and 120b might not be provided because it might only appeal to a single user or those users might have different privacy expectations. For example, item B as depicted in user interface 120a in FIG. 1 might not appear because it is not provided within user interface 120b in FIG. 1.

In some implementations, upon detection of user 130c (i.e., a stranger or guest in the environment), the user interface can also be adapted to take into account an unrecognized user. For example, upon detection of an unrecognized user, some content might be removed from a user interface. When the unrecognized user leaves, this can be detected, and therefore, home assistant device 110 can then provide the removed content back with the user interface. As a result, the user's privacy expectations can be maintained when guests are nearby.

Other types of changes in context of the environment other than detection of strangers or guests can include determining differences in time. For example, a user might find it acceptable to display some content on the GUI late at night or early in the morning, but might not want that content displayed during the daytime because the likelihood of others seeing that content might be higher. Another example can include activities of persons within the environment. For example, if several people in the environment are discussing a particular topic, a social gathering is taking place, etc. then perhaps a user's privacy expectations can be elevated and, therefore, some of the content that would otherwise be displayed can be removed.

In some implementations, a user's privacy expectations can be set by that user or learned by home assistant device 110 over time, or a combination of both. For example, the user can indicate that certain content should not be displayed when unrecognized persons are in the environment. As another example, the user might remove content from the GUI and home assistant device 110 can identify the context in the environment when the user removed the content to determine the user's privacy expectations.

Figure 6:
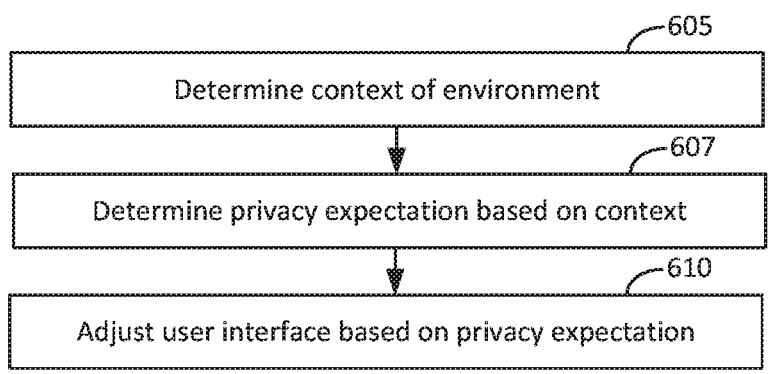
FIG. 6 illustrates an example of a block diagram for adjusting a user interface to maintain privacy expectations.

FIG. 6 illustrates an example of a block diagram for adjusting a user interface to maintain privacy expectations. In FIG. 6, at block 605, the context of the environment can be determined. For example, the presence of persons including recognized users and/or strangers, the time, activities being performed in the environment, etc. can be determined. At block 607, privacy expectations for a user based on the context can be determined. For example, if a user is within the environment, a GUI providing various content can be provided. However, if strangers or guests are detected within the environment, the user might not want certain content displayed on the GUI due to an increase in privacy concerns resulting in higher privacy expectations for that content. Thus, at block 610, the GUI can be adjusted or modified based on the privacy expectations. For example, the content can be removed due to the increase in privacy expectations while the stranger or guest is present within the environment.

When the stranger or guest leaves, this can be determined as a change in the context of the environment and, therefore, also a change in the privacy expectations for the user. Because the user might be the only person within the environment, the GUI can be modified again to include the content that was previously removed. Thus, if the context of the environment changes and, therefore, the user for whom the GUI is provided has a change in privacy expectations, then the GUI can be adapted.

Many of the examples disclosed herein discuss visual adaptations for the user interface. However, audio adaptations can also be performed based on the context situations described above. For example, the type of voice, accent, volume, etc. can also be adjusted for different user interfaces using the techniques described herein.

Many of the examples disclosed herein discuss speech being recognized. However, other types of audio can also be used with the techniques. For example, noise from objects such as television or radio, a doorbell ringing, a door opening, glass shattering, etc. can also be detected occurrences of activity other than speech.

In some implementations, the content of the user interface can also be changed based on whether or not it is determined that a user is looking at home assistant device 110 or speaking to home assistant device 110. For example, the display screen of home assistant device 110 might be turned off, but can turn on when it is determined that a user is looking at it.

In some implementations, the volume of playback of audio provided by home assistant device 110 can be adjusted (e.g., lowered) upon detection of an incoming phone call or page (e.g., via a mobile phone within the home environment). In another example, the content displayed can be adjusted based on the status of another device. For example, a recipe displayed on the display screen of home assistant device 110 can be changed based on determined statuses of a kitchen appliance (e.g., oven, timer, etc.) used for the recipe.

In some implementations, the content provided via the user interface can be based on how a user is using another device within the home. For example, the infrared signals of a television and/or remote control of the television can be detected to indicate which channels are being switched among. This information can be provided to a cloud server by home assistant device 110, which can provide home assistant device 110 with information regarding the content on those channels being watched. For example, the content to be provided via the user interface can include "hot buttons" that can show information regarding the channels (e.g., schedule, current programming, popularity ratings for what is currently being played on the channel, etc.). In another example, if a channel is determined to be playing a sports game, then the score, team information (e.g., team rosters) can be displayed. In some implementations, if the user is determined to be switching between three channels within a short period of time and repeating some of the channels during that short period of time (e.g., each channel is visited at least twice in a five minute period), then hot buttons can be generated for each of those channels. The hot buttons can be displayed in different parts of the display screen and each button can include content representing information corresponding to the channel. For example, the user can be switching between three channels playing three different basketball games. Each of the hot buttons can include the scores and time (e.g., 3:23 left in the fourth quarter) of the game played on that channel. Thus, switching between the different channels can be determined and content for the channels that aren't even being watched can be displayed via the hot buttons. The user can then select one of those buttons and the television can switch to the channel corresponding to the selected button. This can be done with home assistant device 110 communicating with the television either via the wireless network or by generating infrared signals to simulate a remote control.

Many of the aforementioned examples discuss a home environment. In other examples, the devices and techniques discussed herein can also be set up in an office, public facility, etc.

Figure 5:
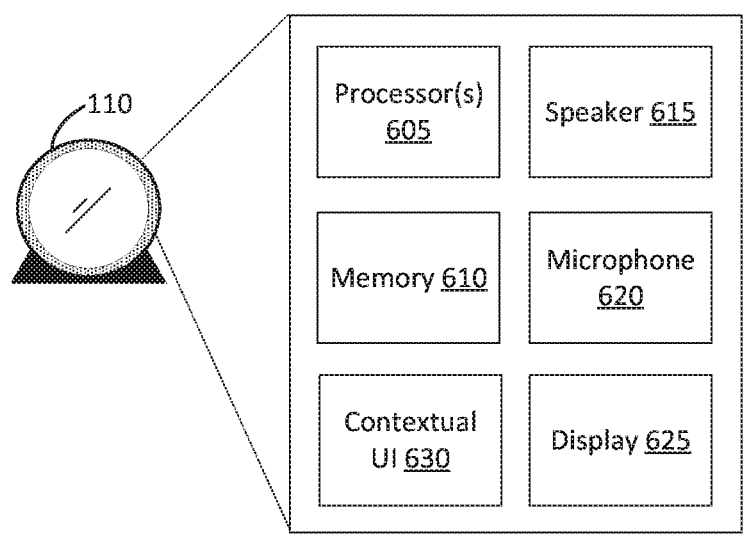
FIG. 5 illustrates an example of an assistant device.

FIG. 5 illustrates an example of an assistant device. In FIG. 5, home assistant device 110 can be an electronic device with one or more processors 605 (e.g., circuits) and memory 610 for storing instructions that can be executed by processors 605 to implement contextual user interface 630 providing the techniques described herein. Home assistant device 105 can also include microphone 620 (e.g., one or more microphones that can implement a microphone array) to convert sounds into electrical signals, and therefore, speech into data that can be processed using processors 605 and stored in memory 610. Speaker 615 can be used to provide audio output. Additionally, display 625 can display a GUI implemented by processors 605 and memory 610 to provide visual feedback. Memory 610 can be a non-transitory computer-readable storage media. Home assistant device 110 can also include various other hardware, such as cameras, antennas, etc. to implement the techniques disclosed herein. Thus, the examples described herein can be implemented with programmable circuitry (e.g., one or more microprocessors) programmed with software and/or firmware, or entirely in special-purpose hardwired (non-programmable) circuitry, or in a combination of such forms. Special-purpose hardwired circuitry may be in the form of, for example, one or more application specific integrated circuits (ASICs), complex programmable logic devices (CPLDs), field programmable gate arrays (FPGAs), structured ASICs, etc.

Those skilled in the art will appreciate that the logic and process steps illustrated in the various flow diagrams discussed herein may be altered in a variety of ways. For example, the order of the logic may be rearranged, sub-steps may be performed in parallel, illustrated logic may be omitted, other logic may be included, etc. One will recognize that certain steps may be consolidated into a single step and that actions represented by a single step may be alternatively represented as a collection of substeps. The figures are designed to make the disclosed concepts more comprehensible to a human reader. Those skilled in the art will appreciate that actual data structures used to store this information may differ from the figures and/or tables shown, in that they, for example, may be organized in a different manner; may contain more or less information than shown; may be compressed, scrambled and/or encrypted; etc.

From the foregoing, it will be appreciated that specific embodiments of the invention have been described herein for purposes of illustration, but that various modifications can be made without deviating from the scope of the invention. Accordingly, the invention is not limited except as by the appended claims.

We claim:

1. A home assistant device, comprising:
   a display screen;
   a microphone;
   one or more processors; and
   memory storing instructions, wherein the one or more processors are configured to execute the instructions such that the one or more processors and memory are configured to:
   determine that first speech has been spoken in an environment of the home assistant device using the microphone;
   determine a first context of the environment of the home assistant device, the first context of the environment including characteristics of the first speech and one or more of a location of a user providing the first speech, a time of the first speech, a user identity corresponding to the user providing the first speech, a skill level with interacting with the home assistant device of the user providing the first speech, or a schedule of the user providing the first speech;
   determine a first distance from a source of the first speech to the home assistant device;
   display a first graphical user interface (GUI) for the home assistant device on the display screen to provide a response regarding the first speech, the first GUI based on the first context of the environment including the characteristics of the first speech, the first distance, and content of the first speech;
   determine that second speech has been spoken in the environment of the home assistant device using the microphone, the first speech and the second speech including the same content;
   determine a second context of the environment of the home assistant device, the second context of the environment including characteristics of the second speech and one or more of a location of a user providing the second speech, a time of the second speech, a user identity corresponding to the user providing the second speech, a skill level with interacting with the home assistant device of the user providing the second speech, a schedule of the user providing the second speech, the first context and the second context being different, wherein the characteristics of the first speech is different than the characteristics of the second speech; and
   determine a second distance from a source of the second speech to the home assistant device, the second distance being farther than the first distance;
   display a second GUI for the home assistant device on the display screen to provide a response regarding the second speech, the second GUI based on the second context of the environment including the characteristics of the second speech, the second distance, and content of the second speech, the first GUI and the second GUI providing different content, the second GUI including content also included in the first GUI, the content in the second GUI being a different size than the content in the first GUI based on the second distance being farther than the first distance, wherein the content on the second GUI is updated at a different speed than the content on the first GUI based on the first context and the second context being different.

2. A method for providing a contextual user interface on an assistant device, comprising:
   determining, by a processor, that a first speech has been spoken;
   determining, by the processor, a first context of an environment corresponding to the first speech, the first context of the environment including how the first speech was spoken;
   determining a first distance from a source of the first speech to the assistant device;
   providing, by the processor, a first user interface based on the first context of the environment including the how the first speech was spoken, the first distance, and content of the first speech;
   determining, by the processor, that a second speech has been spoken, the second speech spoken at a different time than the first speech;
   determining, by the processor, a second context of the environment corresponding to the second speech, the second context of the environment including how the second speech was spoken, the first context and the second context being different, wherein how the first speech was spoken is different than how the second speech was spoken;
   determining a second distance from a source of the second speech to the assistant device, the second distance being farther than the first distance; and
   providing, by the processor, a second user interface based on the second context of the environment including how the second speech was spoken, the second distance, and content of the second speech, the content of the first speech and the second speech being similar, the first user interface and the second user interface being different, the second user interface including content also included in the first user interface, the content in the second user interface being a different size than the content in the first user interface based on the second distance being farther than the first distance, wherein the content on the second user interface is updated at a different speed than the content on the first user interface based on the first context and the second context being different.

3. The method of claim 2, wherein the first context is based on one or both of audio or visual determinations of a surrounding environment of the assistant device that the first speech and the second speech is directed.

4. The method of claim 2, wherein the first context includes a first interaction corresponding to the first speech at the first distance, wherein the second context includes a second interaction corresponding to the second speech at the second distance, the first distance and the second distance being different.

5. The method of claim 2, wherein the first context includes a first user providing the first speech, the second context includes a second user providing the second speech, the first user and the second user being different.

6. The method of claim 5, wherein the first user is associated with a first skill level with interacting with the assistant device, the second user is associated with a second skill level with interacting with the assistant device, the first skill level and the second skill level being different, the first context based on the first skill level, and the second context based on the second skill level.

7. The method of claim 2, wherein the first context and the second context include one or more of a user interacting with an assistant device, people in the environment around the assistant device, a time of an interaction with the assistant device, a location of the user interacting with the assistant device, or a skill level of the user interacting with the assistant device.

8. The method of claim 2, further comprising:
determining, by the processor, a change in the environment; and
generating, by the processor, a third user interface based on one or more of the first context or the second context in response to the change in the environment to maintain privacy expectations of one or more users present in the environment.

9. An electronic device, comprising:
one or more processors; and
memory storing instructions, wherein the processor is configured to execute the instructions such that the processor and memory are configured to:
determine that a first speech has been spoken;
determine a first context of an environment corresponding to the first speech, the first context of the environment including a volume of the first speech;
determine a first distance from a source of the first speech to an assistant device;
generate a first user interface based on the first context of the environment including the volume of the first speech, the first distance, and content of the first speech;
determine that a second speech has been spoken, the second speech spoken at a different time than the first speech;
determine a second context of the environment corresponding to the second speech, the second context of the environment including a volume of the second speech, the first context and the second context being different, wherein the volume of the first speech is different than the volume of the second speech;
determine a second distance from a source of the second speech to the assistant device, the second distance being farther than the first distance; and
generate a second user interface based on the second context of the environment including the volume of the second speech, the second distance, and content of the second speech, the content of the first speech and the second speech being similar, the first user interface and the second user interface being different, the second user interface including content also included in the first user interface, the content in the second user interface being a different size than the content in the first user interface based on the second distance being farther than the first distance, wherein the content on the second user interface is updated at a different speed than the content on the first user interface based on the first context and the second context being different.

10. The electronic device of claim 9, wherein the first context is based on one or both of audio or visual determinations of a surrounding environment of the assistant device that the first speech and the second speech is directed.

11. The electronic device of claim 9, wherein the first context includes a first interaction corresponding to the first speech at the first distance, wherein the second context includes a second interaction corresponding to the second speech at the second distance, the first distance and the second distance being different.

12. The electronic device of claim 9, wherein the first context includes a first user providing the first speech, the second context includes a second user providing the second speech, the first user and the second user being different.

13. The electronic device of claim 12, wherein the first user is associated with a first skill level with interacting with the assistant device, the second user is associated with a second skill level with interacting with the assistant device, the first skill level and the second skill level being different, the first context based on the first skill level, and the second context based on the second skill level.

14. The electronic device of claim 9, wherein the first context and the second context include one or more of a user interacting with an assistant device, people in the environment around the assistant device, a time of an interaction with the assistant device, a location of the user interacting with the assistant device, or a skill level of the user interacting with the assistant device.

15. The electronic device of claim 9, wherein the processor is configured to execute the instructions such that the processor and memory are configured to:
determine a change in the environment; and
generate a third user interface based on one or more of the first context or the second context in response to the change in the environment to maintain privacy expectations of one or more users present in the environment.

16. A computer program product, comprising one or more non-transitory computer-readable media having computer program instructions stored therein, the computer program instructions being configured such that, when executed by one or more computing devices, the computer program instructions cause the one or more computing devices to:
determine that a first speech has been spoken;
determine a first context of an environment corresponding to the first speech, the first context of the environment including an indication that the first speech was spoken at a first speed;
determine a first distance from a source of the first speech to an assistant device;
generate a first user interface based on the first context of the environment including the indication that the first speech was spoken at the first speed, the first distance, and content of the first speech;
determine that a second speech has been spoken, the second speech spoken at a different time than the first speech;

determine a second context of the environment corresponding to the second speech, the second context of the environment including an indication that the second speech was spoken at a second speed, the first context and the second context being different, wherein the first speed and the second speed are different;

determine a second distance from a source of the second speech to the assistant device, the second distance being farther than the first distance; and generate a second user interface based on the second context of the environment including the second speed of the second speech, the second distance, and content of the second speech, the content of the first speech and the second speech being similar, the first user interface and the second user interface being different, the second user interface including content also included in the first user interface, the content in the second user interface being a different size than the content in the first user interface based on the second distance being farther than the first distance, wherein the content on the second user interface is updated at a different speed than the content on the first user interface based on the first context and the second context being different.

17. The computer program product of claim 16, wherein the first context is based on one or both of audio or visual determinations of a surrounding environment of the assistant device that the first speech and the second speech is directed.

18. The computer program product of claim 16, wherein the first context includes a first interaction corresponding to the first speech at the first distance, wherein the second context includes a second interaction corresponding to the second speech at the second distance, the first distance and the second distance being different.

19. The computer program product of claim 16, wherein the first context includes a first user providing the first speech, the second context includes a second user providing the second speech, the first user and the second user being different.

20. The computer program product of claim 19, wherein the first user is associated with a first skill level with interacting with the assistant device, the second user is associated with a second skill level with interacting with the assistant device, the first skill level and the second skill level being different, the first context based on the first skill level, and the second context based on the second skill level.

21. The computer program product of claim 16, wherein the first context and the second context include one or more of a user interacting with an assistant device, people in the environment around the assistant device, a time of an interaction with the assistant device, a location of the user interacting with the assistant device, or a skill level of the user interacting with the assistant device.

22. The computer program product of claim 16, wherein the computer program instructions cause the one or more computing devices to:
determine a change in the environment; and
generate a third user interface based on one or more of the first context or the second context in response to the change in the environment to maintain privacy expectations of one or more users present in the environment.

23. The computer program product of claim 16, wherein a location of the content on the second user interface is different than a location of the content on the first user interface based on the second distance being farther than the first distance.

* * * * *